United States Patent [19]

Bashan et al.

[11] Patent Number: 5,339,000
[45] Date of Patent: Aug. 16, 1994

[54] SYSTEM FOR MONITORING PARKED VEHICLES

[75] Inventors: Oded Bashan, Karmiel; Moshe Aduk, Kiryat-Shemona; Ronnie Gilboa, Moshav Beit-Hillel; Nehemya Itay, Kibbutz Kfar-Giladi; Dubi Shure, Kfar Vradim, all of Israel

[73] Assignee: Easy Park Ltd., Rosh Rina, Israel

[21] Appl. No.: 916,389

[22] Filed: Jul. 20, 1992

[30] Foreign Application Priority Data

Jul. 18, 1991 [IL] Israel ............................... 98880

[51] Int. Cl.$^5$ .............................................. G08G 1/14
[52] U.S. Cl. ................................ 340/932.2; 340/928
[58] Field of Search ....................... 340/932.2, 928; 235/380, 384; 364/467, 464.01

[56] References Cited

U.S. PATENT DOCUMENTS

| | | | |
|---|---|---|---|
| 4,303,904 | 12/1987 | Chasek | 340/928 |
| 4,310,890 | 1/1982 | Trehn et al. | 364/467 |
| 4,730,285 | 3/1988 | Lie | 368/90 |
| 4,876,540 | 10/1989 | Berthon | 340/932.2 |

FOREIGN PATENT DOCUMENTS 0402821 12/1990 European Pat. Off.
2562291 10/1985 France.

*Primary Examiner*—Hezron E. Williams
*Assistant Examiner*—Christine K. Oda
*Attorney, Agent, or Firm*—Helfgott & Karas

[57] ABSTRACT

A parking system includes a portable parking tag for each vehicle and a reading device. The portable parking tag includes a non-contact data communications circuit for effecting data transfer by mutual electromagnetic coupling with the reading device, a memory coupled to the data communications circuit for storing at least one parking parameter, and an antenna coupled to the data communications circuit for transmitting a first signal representative of each parking parameter. The reading device includes an antenna for receiving a first signal, a reading circuit coupled to the antenna and responsive to the first signal for reading each parking parameter stored in the parking tag memory, a validity verification circuit coupled to the reading circuit and responsive to the first signal for generating a validity signal, and output circuit coupled to the validity verification circuit and responsive to the validity signal for producing a visual or audible output signal.

20 Claims, 8 Drawing Sheets

SYSTEM FOR MONITORING PARKED VEHICLES

FIELD OF THE INVENTION

This invention relates to a system for monitoring a plurality of parked vehicles.

BACKGROUND OF THE INVENTION

In spite of the very large number of different parking systems currently in existence, such systems generally fall into one of three categories. Coin-operated parking meters each relating to a respective parking space are in use, requiring a motorist to pay for a limited amount of parking time, after which time the parking meter shows a suitable excess-time signal. A municipal parking official checks the parking meters manually and issues a report in respect of any vehicle which is parked alongside a parking meter showing such an excess-time signal.

A particular drawback with such a system is that, since the parking meter itself contains coins, it is subject to vandalism and, furthermore, such meters are usually prone to mechanical failure.

Consequently, pre-paid parking cards are often sold by the municipality for displaying in a vehicle parked in a valid parking space within the municipality. Such cards have a number of partially perforated apertures, selected ones of which can be completely perforated so as to display a date and time during which the motorist wishes to park his vehicle. Typically, each parking card provides a one hour parking so that, in the event that the motorist wishes to park for more than one hour, he must display a corresponding number of cards through the window of his vehicle.

In such a system, the municipal parking official must approach each vehicle in order to read the parking card or cards displayed therein so as to check (1) that they have indeed been completely perforated, and (2) if so, that the vehicle is validly parked. In this context, the vehicle will be validly parked if the start time perforated by the motorist is prior to the actual time of inspection by the parking official and the time which has elapsed since that time does not exceed a maximum permitted time.

Such parking cards overcome the tendency for vandalism associated with mechanical coin-operated parking meters but they still suffer from a number of drawbacks. Thus, whilst coin-operated parking meters can usually be seen from a distance, particularly if the excess-time flag is displayed, the perforations in the parking cards can only be inspected from very close range thus placing a greater burden on the municipal parking official. Furthermore, such parking cards invite a certain amount of fraud on the part of an unscrupulous motorist who might be tempted to perforate a start time somewhat later than the actual start time on the assumption that, statistically at least, no parking official will inspect his vehicle prior to the incorrect start time which he has entered.

It should be noted that various electronic systems also exist, such as, for example, U.S. Pat. No. 4,730,285 (John Lie) which discloses an individual parking meter which is, in effect, a debit card, for displaying parking time information and including a switch for starting and stopping the parking meter. Also included is a parking zone selector affecting the time consumption so as to be dependent on a preselected parking zone. A display shows the remaining time credit in respect of which the parking meter may be used as well as the allowed parking time remaining at any time in the current zone which also is displayed.

Such a system is obviously more flexible than an individual pre-printed parking card but is also significantly more expensive and must be discarded upon expiry.

Israel Patent Nos. 72802 and 76111 assigned to N.T.E. Parkulator likewise disclose electronic time metering devices comprising a time storage device for storing data corresponding to a pre-purchased time limit, a time measuring device and means for manually selecting a predetermined time interval. Means for decrementing an elapsed time period from the pre-purchased time are provided as well as a display means, which may be a bar-type display, for displaying the available time.

Finally, mention must be made of the vast number of parking management systems which usually include an entry barrier such that the time of entry of a vehicle there-through is measured and recorded either manually or automatically. Prior to the vehicle's leaving the parking lot, the exit time is likewise measured and the motorist is presented with a bill in respect of each hour or part thereof during which his vehicle was parked.

A major drawback of such systems from the point of view of the municipality is that they must be constantly and individually attended and therefore the system is labor intensive compared with parking meter or card systems. There is also a drawback from the motorist's point of view, which applies equally to the other parking systems described above, in that even if he only uses a fraction of the final hour he must still pay for the complete hour. Whilst this probably increases the revenue for the municipality it is hardly fair on the motorist and probably discourages him from vacating his parking place promptly particularly if, by doing so, he would obtain little value from his final hour's parking.

In municipal un-managed parking systems such as road-side parking spaces employing parking meters or parking cards, a predetermined parking time is purchased by the motorist which may or may not be further qualified by a maximum time limit associated with the parking space. Even when no such parking time limit is imposed by the municipality, the motorist must ensure that he pre-purchases sufficient parking time either by inserting sufficient coins into the parking meter or by displaying a sufficient number of parking cards, so that he is not inadvertently absent for a longer period than his pre-purchased parking time. Since it is obviously not always easy for a motorist to predict how long he is likely to require parking in advance, this requires either that he takes a risk in order to minimize his expenses or, alternatively, that he plays safe notwithstanding the additional cost that he thereby incurs. This drawback would, of course, be obviated if his pre-purchased parking time were partially redeemable in respect of any unused time. This is accomplished, to some extent, by debit card types of parking meter such as disclosed in U.S. Pat. No. 4,730,285 discussed above, although the solution proposed therein is only partial seeing that the disclosed parking meter cannot be extended or renewed and reused.

Yet a further drawback associated with hitherto proposed parking systems relates to the manner in which a parking ticket is issued by the municipal parking official. On the one hand, it is known that motorists sometimes destroy their parking tickets without paying in the hope that the municipality will overlook the fact that a parking ticket was issued. On the other hand, it also sometimes occurs that vandals remove parking tickets so that the motorist does not even know that one was issued until he subsequently receives a reminder from the municipality. Such reminders, usually accompanied by late-payment fines, are normally received by the motorist several months after the alleged parking offence and usually the motorist has no option but to rely on the integrity of the municipality that the alleged parking offence did indeed occur.

It has been known that unscrupulous parking officials have fraudulently reported fictitious parking offenses to the municipality after destroying the original copy of the parking ticket. When the motorist subject of such fraud eventually receives a reminder from the municipality that his parking fine was not paid, the reminder is, in fact, his first indication that such a parking offence occurred in the first place. However, with the passage of time, it is very difficult for him to prove that he was not guilty of the alleged offence and, even if the required proof is available, this is usually at the expense of an appearance in Court, possibly accompanied by lawyers' fees, all of which would likely be more expensive for the motorist than simply paying the fine without argument.

These problems result from the fact that the parking ticket issued by the municipality, even when genuine, is located somewhere on the outside of the vehicle since access to within a locked vehicle is clearly impossible. The parking ticket is thus susceptible to loss, either wilful or otherwise, prior to the motorist returning to his vehicle. The possibility of such loss has sometimes been capitalized on by unscrupulous motorists or parking officials.

A further important drawback with all hitherto proposed parking systems is that they are managed by a particular municipality which is obviously concerned to maximize its own revenue. Specifically, pre-perforated parking cards of the type described above are issued by each individual municipality separately and are not transferable. This means that a motorist must equip himself with a variety of such parking cards in respect of each city in which he expects to park. This is only mildly inconvenient when he only parks his vehicle in a small number of locations, such as his home city and maybe his place of work but is highly inconvenient if he ventures out of his normal locality for any reason. For example, if he goes on business or vacation to a city for which he does not have a stock of parking cards, he must first locate a vendor from whom the parking cards may be purchased and this is a major burden.

Electronic parking cards having zone selection capability such as above-mentioned U.S. Pat. No. 4,730,285 appear to offer a solution to this problem. However, in practice, the solution is unacceptable for the simple reason that no municipality is prepared to accept a parking card issued by another municipality, if the pre-purchased parking credit is paid to that other municipality unless there exists genuine reciprocity between different municipalities. However, such reciprocity cannot in practice exist where different municipalities have different parking densities and tariffs. Obviously, a municipality having a high parking density will be loathe to accept parking cards issued by a different municipality having a much reduced parking density since the assumption of reciprocity is that equal numbers of motorists will park their vehicles across the border in municipal parking lots. This is clearly not true, particularly when large numbers of motorists commute to work in a high density parking municipality from a low parking density municipality.

SUMMARY OF THE INVENTION

It is an object of the invention to provide a system for monitoring a plurality of parked vehicles in which the drawbacks associated with hitherto proposed systems are substantially reduced or eliminated. monitoring a plurality of parked vehicles, which comprises a portable parking tag to be placed in a vehicle; and a reading device. The portable parking tag includes a non-contact data communications circuit for effecting data transfer via mutual electromagnetic coupling with the reading device, a parking tag memory coupled to the data communications circuit for storing at least one parking parameter, a parking tag antenna coupled to the data communications circuit for transmitting a first signal representative of said at least one parking parameter stored in the parking tag memory, and electrical supply means coupled to the non-contact data communications circuit and to the parking tag memory for supplying electrical power thereto. The reading device includes a reading device antenna for receiving the first signal, a reading circuit coupled to the reading device antenna and responsive to the first signal for reading said at least one parking parameter stored in the memory of the parking tag, validity verification means coupled to the reading circuit and responsive to the first signal for generating a validity signal, and output means coupled to the validity verification means and responsive to the validity signal for producing a visual or audible output.

Preferably, the reading device is carried by a parking official who consequently does not need to scrutinize each displayed parking tag, since the data contained therein is read remotely using non-contact data communications.

Preferably, the output means in the reading device includes a small, portable printer by means of which conventional type parking tickets are printed for placing on the windshield of the offending vehicle. However, in addition, an identity of the offending vehicle is automatically transmitted from the displayed parking tag to the reading device for storage therein and details of the parking violation are likewise transmitted by the reading device to the parking tag for storage in the parking tag memory.

By this means, it is impossible for the parking official to report a fictitious parking violation to the municipality since every such claim must be supported by the identity of the offending vehicle being stored within the reading device. Clearly, this cannot be entered fraudulently by the parking official. Furthermore, the motorist also is unable subsequently to deny ever having received a parking ticket since the issue of such a ticket is indelibly recorded in the memory of his parking tag.

In a preferred embodiment of the invention, a predetermined available credit is recorded into the parking tag memory so as subsequently to be decremented in respect of actual use so that the motorist pays only for the actual parking time and not for complete hours thereof as is required in most current systems.

Preferably, zone selection means are provided in the parking tag by means of which the motorist may select a specific zone wherein parking is required, there being associated with each such zone respective parking conditions such as parking tariff, maximum parking time limit, cumulative debit and so on. The pre-stored credit in such a parking card may then be renewed by a central computer which reads each of the cumulative monetary debits associated with each parking zone and then diverts the necessary funds to each respective municipality. This permits the resulting parking tag to be completely flexible and not limited to a specific city or zone therein as is the case with hitherto proposed systems.

BRIEF DESCRIPTION OF THE DRAWINGS

For a clearer understanding of the invention and to see how the same may be carried out in practice, a preferred embodiment will now be described, by way of non-limiting example only, with reference to the accompanying drawings, in which.

DETAILED DESCRIPTION OF PREFERRED EMBODIMENTS

Figure 1:
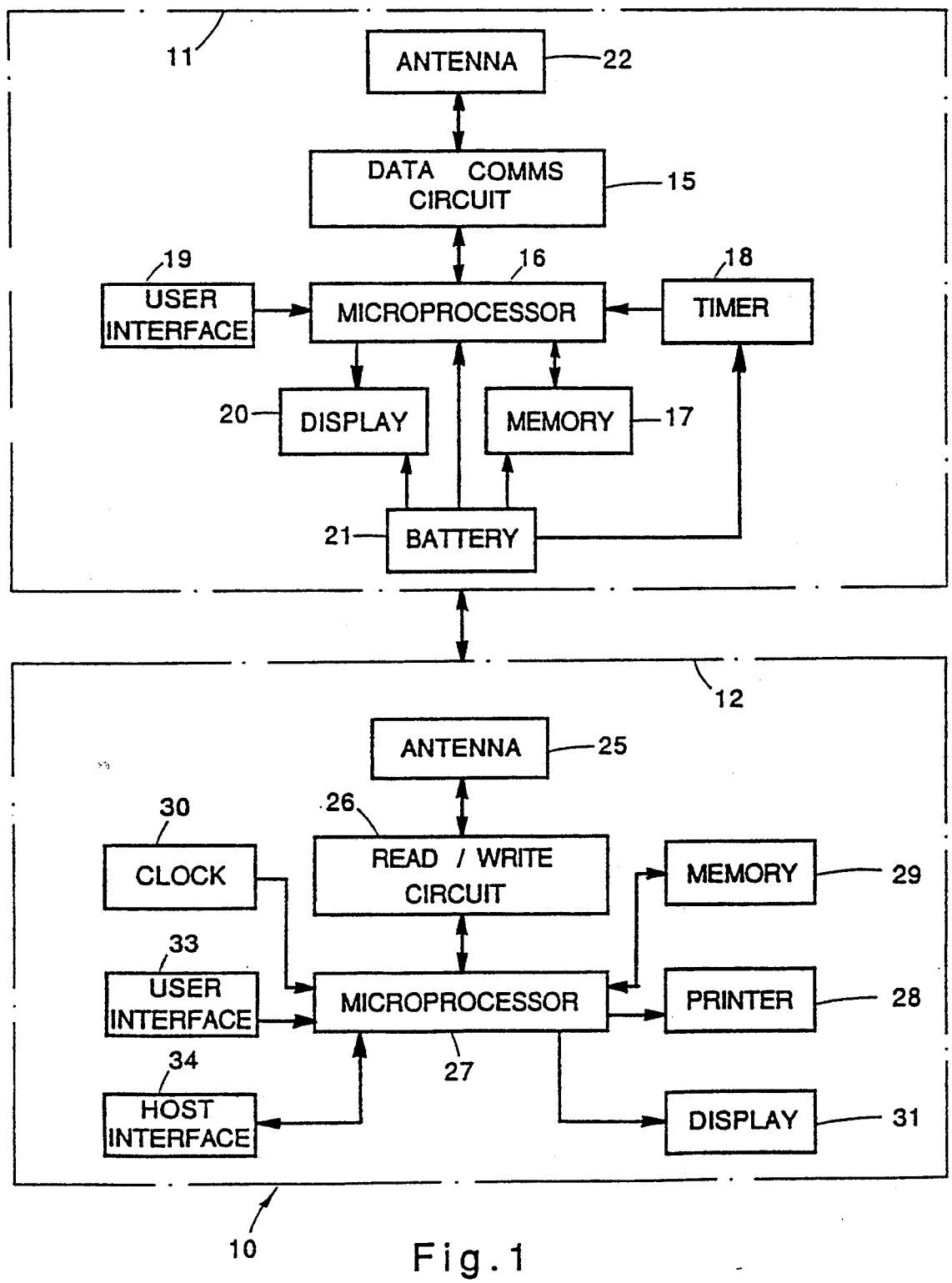
FIG. 1 is a block diagram showing a system for monitoring a parked vehicle according to the invention.

Referring to FIG. 1, there is shown a system 10 for monitoring a plurality of parked vehicles including a portable parking tag 11, and a portable reading device 12 carried by a parking official. The portable parking tag 11 includes a non-contact data communications circuit 15 for effecting data transfer via mutual electromagnetic coupling with the reading device 12. Coupled to the data communications circuit 15 is a microprocessor 16 (constituting a processing means) having coupled thereto a memory 17, a timer 18, a user interface 19 and a display 20. The microprocessor 16, the memory 17, the timer 18 and the display 20 are energized by a battery 21 coupled thereto.

The portable reading device 12 transmits an interrogation signal to the portable parking tag 11 which is received by an antenna 22 thereof (constituting a parking tag antenna). Data corresponding to a plurality of parking parameters are stored in the memory 17 of the portable parking tag 11 and the data communications circuit 15 modulates the interrogation signal received by the antenna 22 with a first signal representative of the stored data. The first signal is sensed by an antenna 25 in the portable reading device 12 by means of electromagnetic coupling between the two antennae 22 and 25. The antenna 25 constitutes a reading device antenna which is coupled to a reading circuit 26 which is responsive to the modulated interrogation signal so as to extract therefrom the first signal and hence the parking parameters transmitted by the portable parking tag 11. In such an arrangement, the interrogation signal constitutes a second signal which functions as a carrier signal for effecting data communication between the portable parking tag 11 and the portable reading device 12.

A microprocessor 27 (constituting a validity verification means) is coupled to a memory 29 and to the reading circuit 26 and is responsive to the first signal for generating a validity signal in accordance with predetermined criteria described in greater detail below. A portable printer 28 coupled to the microprocessor 27 is responsive to the validity signal generated thereby for printing a parking ticket in the event that the vehicle associated with the portable parking tag 11 is invalidly parked.

Also coupled to the microprocessor 27 is a clock 30, a display 31 and user and host interfaces 33 and 34, respectively. The clock 30 produces a signal corresponding to the time and date which are recorded on any issued parking ticket. The display 31 displays data processed by the microprocessor 27 and the user interface 33 allows the parking official to enter data thereto. The host interface 34 permits the portable reading device 12 to be coupled to a remote computer and is used for example to feed data to the computer relating to the parking official's activities and to receive data from the computer relating, for example, to stolen vehicles' license numbers, and so on.

Non-contact data communication systems per se are known in the art. Thus, in U.S. Pat. No. 3,299,424 (Vinding) there is disclosed an interrogator-responder identification system in which the responder is identified when inductively coupled to the interrogator. The inductive coupling is achieved by means of resonant circuits tuned to the same frequency within the responder and interrogator, thereby enabling non-contact communication between the two.

In a preferred embodiment the responder is self-powered, deriving its d.c. supply voltage by rectifying a portion of the induced interrogator signal.

Data stored within the responder is read, or identified, by the interrogator by means of a detuning or loading circuit coupled to the responder through a switch means. The switch means is activated in response to the stored data so as to load the responder resonant circuit, thereby decreasing its interaction with the interrogator resonant circuit. Consequently, the varying loading effect of the responder on the interrogator resonator circuit may be interpreted in terms of the responder data. For example, a signal corresponding to the responder data may be transmitted to the interrogator by amplitude-or phase-modulating the resonant frequency signal of the interrogator.

Whilst Vinding discloses a system in which a responder, self-powered by means of a signal transmitted by an interrogator, transmits data to the interrogator, there is no provision for writing data from the interrogator to the responder.

U.S. Pat. No. 4,845,347 (McCrindle et al.) discloses a transaction system permitting bi-directional communication between a portable token and a terminal. Both the terminal and the token include resonant circuits tuned to the same frequency and the token is self-powered by the energy transmitted by the terminal resonant circuit and received by the token resonant circuit by mutual coupling.

U.S. patent application Ser. No. 636,086 filed on Dec. 28, 1990 in the name of Bashan et al. and assigned to On Track Innovations Ltd. discloses a data transmission system for the non-contact transmission of data between a station and a portable data carrier. The station includes a station transmitter operating at a predetermined frequency for generating a first signal and a demodulator for detecting a second signal superimposed on the first signal. An antenna is coupled via a length of cable to the station transmitter via a matching circuit so as to be operative at the transmitter frequency regardless of the length of the cable. The portable data carrier includes supply means for coupling to a source of electric power and a data carrier tuned antenna circuit inductively coupled with the station transmitter so as to receive power from the station. A data carrier data modulator is provided for modulating the first signal with the second signal in response to data stored within the data carrier and, by means of said inductive coupling, enabling the data to be transmitted from the data carrier to the station.

Data transfer between the portable parking tag 11 and the reading device 12 may be accomplished in accordance with the teachings of any of the above mentioned references all of which are incorporated herein by reference.

Figure 2A:
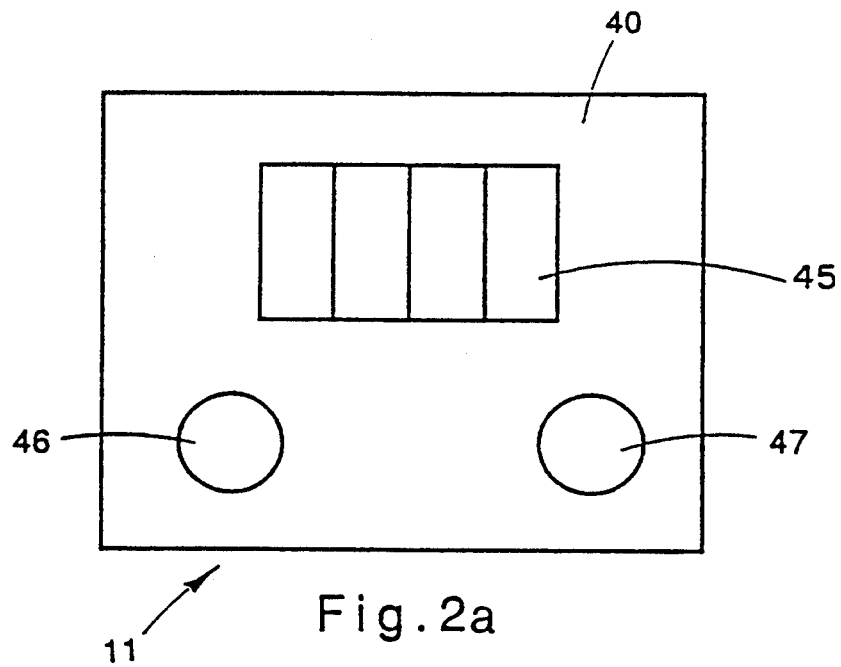
FIGS. 2a and 2b are schematical views of a front side and a rear side, respectively, of a portable parking tag for use in the system shown in FIG. 1.
Figure 2B:
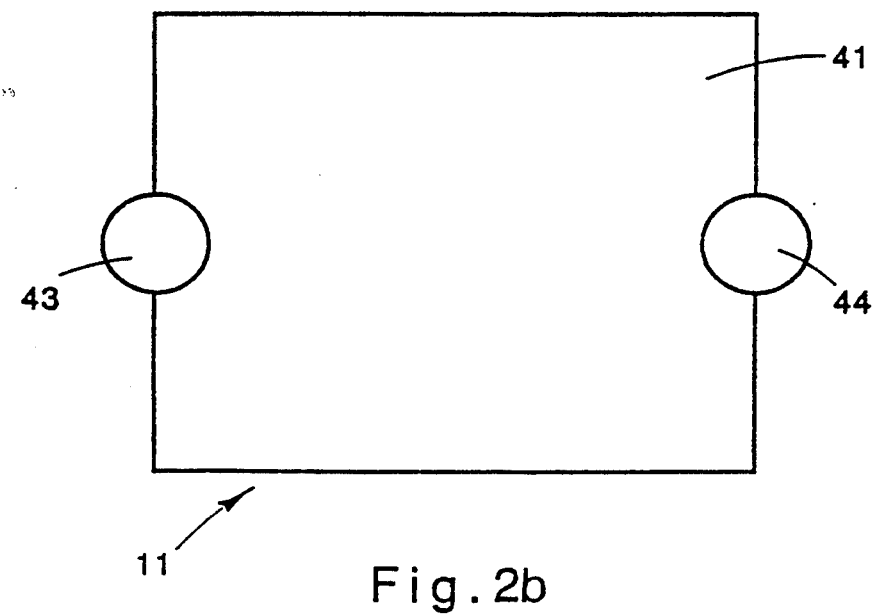

Referring now to FIG. 2 there is shown a pictorial representation showing the portable parking tag 11 which includes a plastic rectangular housing having a front surface 40 and a rear surface 41. The rear surface 41 is fixed to an inside surface of a car window via suction pads 43 and 44, the front surface 40 thus facing inside the car so as to be visible to the motorist. Accessible from the front surface 40 of the portable parking tag 11 is a liquid crystal display (LCD) 45 corresponding to the display 20 shown in FIG. 1 and a pair of push-button selector switches 46 and 47, together corresponding to the user interface 19 shown in FIG. 1.

In use, the portable parking tag 11 is loaded with an amount of monetary credit stored within the memory 17. Also stored within the memory 17 are data representative of an identity of the vehicle and/or the motorist in respect of which the parking tag 11 is valid for use, a plurality of zones wherein the vehicle bearing the parking tag 11 may be validly parked and a like plurality of parking tariffs, each corresponding to one of the zones. Likewise, for each zone there is stored a corresponding parking time limit being the maximum continuous time for which a vehicle may be parked in that zone.

The parking tag circuitry is powered by the battery 21 which supplies power at least to the micro-processor 16, the memory 17, the timer 18 and the display 20 during the time that the timer 18 and/or the display 20 are active. The data communications circuit 15 may also be powered by the battery 21 or, alternatively, may be self-powered by a signal transmitted to the portable parking tag 11 by the reading device 12 and rectified within the portable parking tag 11 in a manner well known in the art. When the portable parking tag 11 is inactive, it may still be interrogated by the portable reading device 12 and in this case the portable parking tag 11 will likewise be self-powered in similar manner.

When a parking official wishes to check that a particular vehicle is validly parked, he directs the reading device 12 towards the parking tag 11 displayed by the vehicle so as to transmit thereto an interrogation signal (constituting a second signal) for initiating the data communications circuit 15 within the portable parking tag 11. Upon being thus initiated, the data communications circuit 15 modulates the interrogation signal with a first signal representative of data stored in the memory 17 so as thereby to transmit relevant parking parameters to the reader 12.

The parking parameters include an identity of the vehicle being checked by the reading device 12. It may occur that the validity itself identifies the vehicle as being entitled to unlimited parking within a particular zone or, indeed, within all zones associated with the portable parking tag 11. In this case, the validity verification means 27 is responsive to the vehicle's identity for generating a validity signal indicative of the fact that the vehicle is validly parked.

More generally, the parking parameters stored within the memory 17 of the parking tag 11 relate to a monetary credit which is continuously debited according to the cumulative parking time for which the parking tag 11 has been used. In order to determine the cumulative debit relating to such parking time, the timer 18 is responsive to respective start and stop signals generated by the successive depressions of the push-button switch 46 so as to determine an elapsed time period during which the parking tag 11 was in use. The elapsed time period is multiplied by the prevailing tariff so as to determine the cumulative parking debit which is then subtracted from the remaining credit stored within the memory 17.

Figure 3:
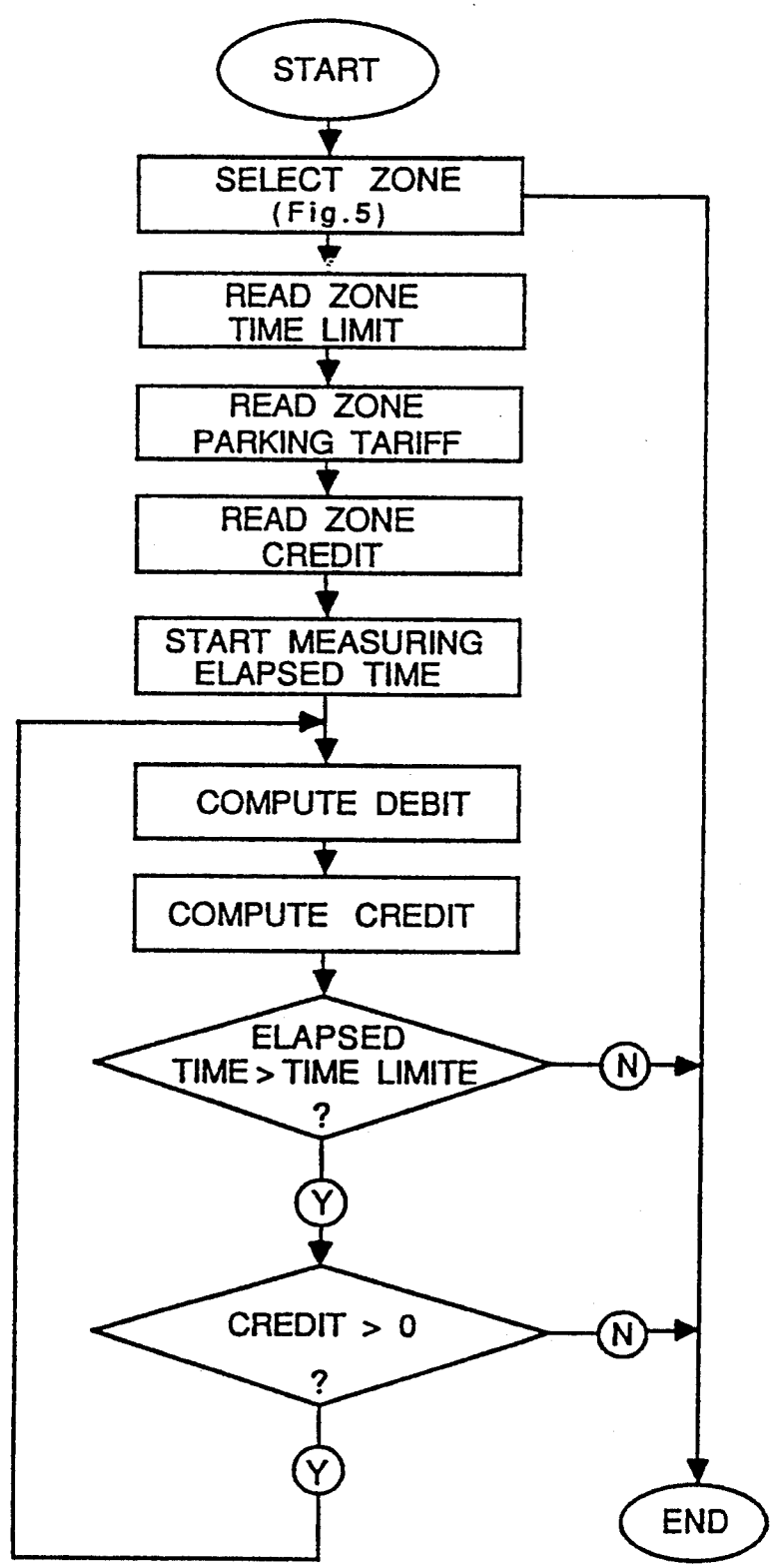
FIG. 3 is a flow diagram relating to the principal functions of a parking tag having zone selection capability.

Referring now to FIG. 3 of the drawings, there is shown a flow diagram relating to the overall functions of the parking tag 11.

On switching on the device, a battery check function is initiated (see FIG. 4) and a zone is selected corresponding to the parking zone in which the vehicle is to be parked. Any parking parameters associated with the selected zone are then read from the memory 17 in the parking tag 11 so as to determine, for example, the parking time limit associated with the selected zone. Typically, the parking time limit relates to the maximum time for which parking is allowed in the selected zone. However, it may also relate to one or more time zones during which parking is prohibited within the selected zone.

Additionally, selection of the zone permits determination of the parking tariff relating thereto. The monetary credit stored within the memory 17 of the parking tag 11 is also read, whereupon depression of the selector switch 46 activates the timer 18 which starts to measure the elapsed time subsequent to its activation.

In real time, at predetermined time intervals, the parking debit is calculated, being equal to the product of elapsed time multiplied by the parking tariff, and the available credit is up-dated accordingly. Two checks are also initiated under control of the microprocessor 16: the measured elapsed time is compared with the parking time limit and a check is performed to ensure that the available credit is non-zero.

In the event that either the measured elapsed time exceeds the parking time limit, or the available credit is zero, subsequent parking in the selected zone is invalid and further processing within the parking tag 11 stops.

Figure 4:
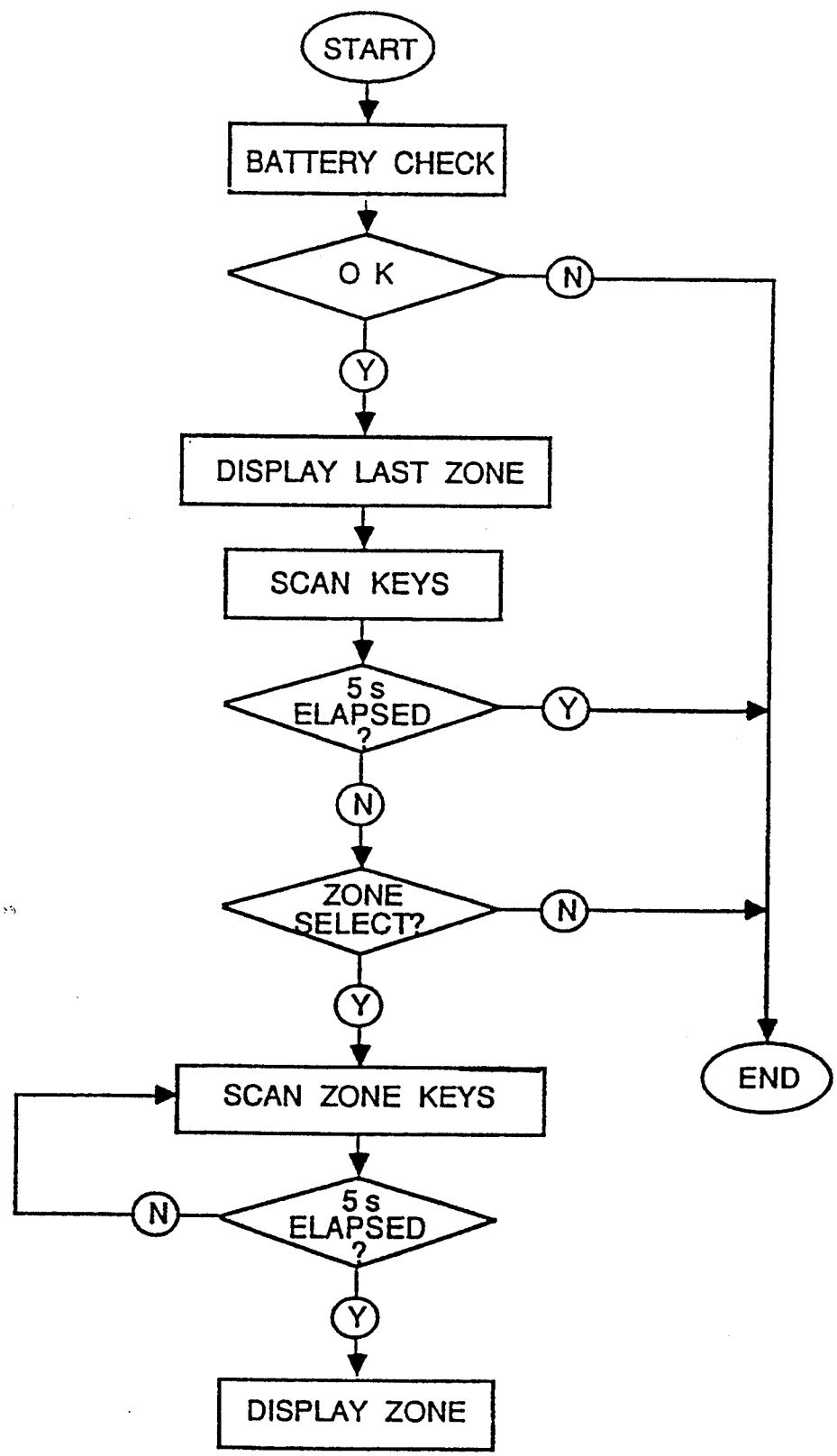
FIGS. 4 and 5 are flow diagrams showing the principal operating steps associated with the zone selection function shown in FIG. 3.

FIG. 4 shows the principal steps associated with the zone selection described above with reference to FIG. 3. As was explained above, on switching on the parking tag 11, a battery check procedure is initiated, further use of the parking tag 11 being disabled in the event that the battery is low. In effect, this provides a warning to the motorist not to use a parking tag with a spent battery so as to avoid the possibility that the battery will run out during a parking transaction, thereby possibly giving an invalid parking signal through no fault of the motorist.

If the battery check is affirmative, the previously selected zone is displayed and the selector keys 46 and 47 are scanned in order to determine whether the motorist wishes to select an alternative zone. In the event that the selector switches 46 and 47 have not been depressed within 5 seconds of switching on the parking tag 11, it is assumed that the current zone is identical to the previously selected zone displayed on the LCD display 20. Otherwise, the system checks that the depressed key 46 or 47 corresponds to the zone select key and, if so, subsequent depression of the zone select key is scanned and the corresponding zone displayed on the LCD display 20. The cycle repeats until no further depression of the zone select key is detected for a period of 5 seconds, upon which the selected zone is displayed and the procedure ends.

Figure 5:
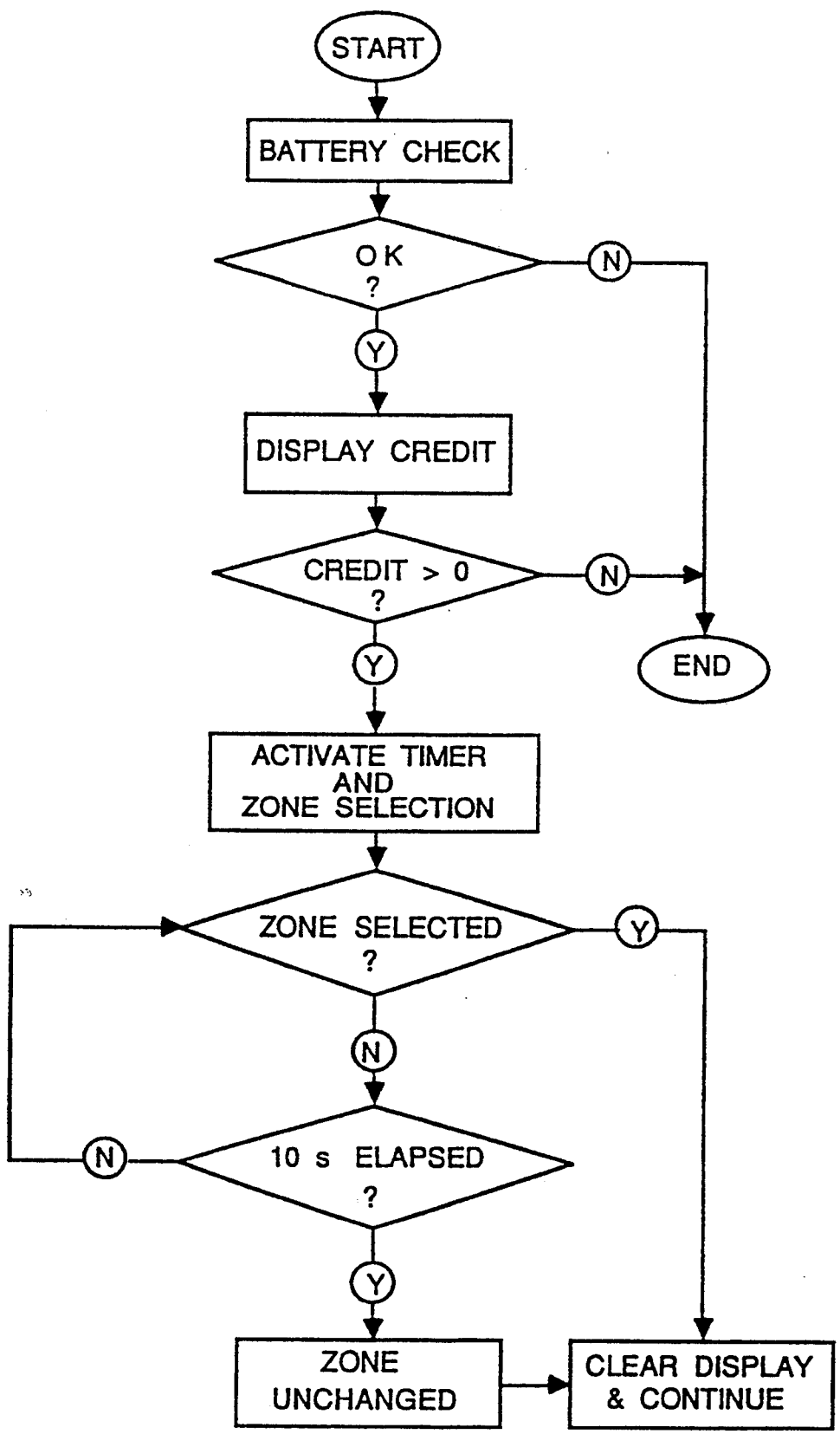

FIG. 5 shows a further detail of the operation of the parking tag 11, wherein after power-on and completion of a successful battery check, the remaining credit stored within the memory 17 of the parking tag 11 is displayed, the timer and zone selection functions being activated in the event that the credit is positive.

The zone selection function described above with reference to FIG. 4 of the drawings is then initiated, the motorist being given 10 seconds for selecting a new zone. After 10 seconds has elapsed and regardless of whether a new zone has, in fact, been selected or not, the display 20 is cleared and the parking tag 11 continues to operate in accordance with the procedure described above with reference to FIG. 3 of the drawings.

It will be noted that during normal operation of the parking tag 11, subsequent to its initialization and zone selection by the motorist, the display 20 is cleared in order to conserve battery power. The microprocessor 16, the memory 17, the timer 18 and the display 20 all operate from the internal battery in the portable parking tag 11 and therefore in order to reduce the battery drain, the display 20 is automatically cleared since there is no need to display parking parameters continuously throughout the parking transaction. The data communications circuit 15 may also operate from the internal battery, although this can also be powered via the interrogation signal transmitted by the reading device 12, as is well known in the art and described in detail in any of the prior art references disclosed above.

Figure 6:
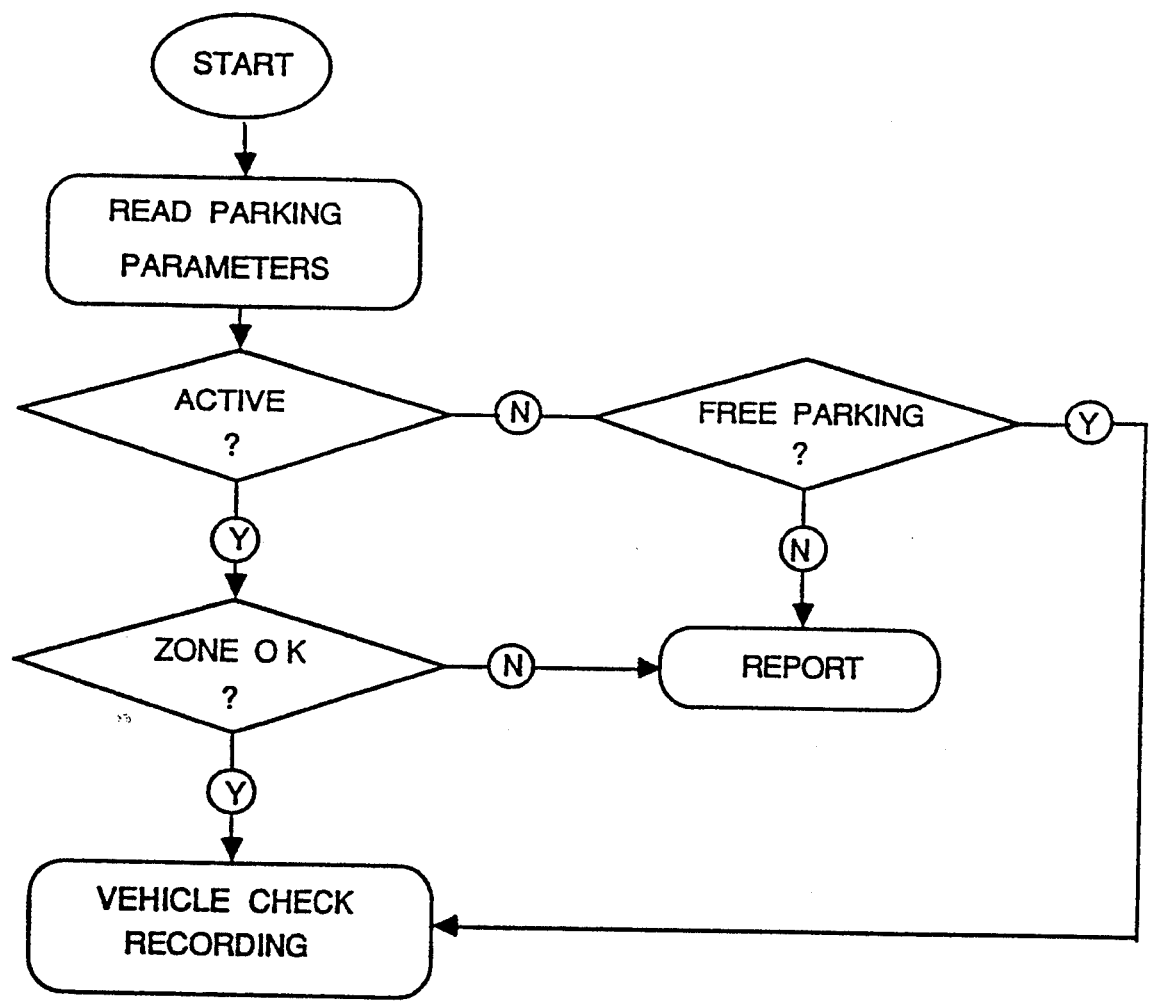
FIG. 6 is a flow diagram relating to the principal functions of a reading device for use in the system shown in FIG. 1.

Referring now to FIG. 6 of the drawings, there are shown basic details relating to the operation of the reading device 12. The reading device 12 reads the parking parameters stored within the memory 17 of the parking tag 11, in order to determine at least the identity of the vehicle as well as other information as described above. The reading device 12 then determines whether the parking tag 11 is active or not, i.e. whether the timer 18 within the parking tag 11 has been initiated. If in the negative, the reader 12 determines whether the vehicle is entitled to free parking, such as might be the case, for example, if the vehicle is parked in its own residence or residential area or, for any other reason, the identity of the vehicle marks it as being entitled to free parking.

If the parking tag 11 is inactive and the vehicle's identity does not indicate that it is entitled to free parking, a report is printed on the printer 28 of the reading device 12 and the fact that such a report has been issued is recorded within the memory 29 of the reading device 12 and is also transmitted to the parking tag 11 for storage in the memory 17 thereof.

If the parking tag 11 is active, then a check is initiated to determine that the selected zone corresponds to the actual zone in which the vehicle is parked and, if not, a report is printed and the fact is stored both in the memory 29 of the reading device 12 and in the memory 17 of the parking tag 11.

It will be understood that FIG. 6 is only representative and, in practice, further checks are performed, as required, in order to check that the time limit has not been exceeded for the selected zone, that there remains credit within the parking tag 11, and so on.

In the event that all such checks are affirmative and that the vehicle is thus validly parked within the selected zone, this also is recorded in the memory 29 of the reading device 12, so that the municipality obtains some feedback regarding the number of vehicles inspected by the parking official.

It will be understood that the operations described above relate merely to one preferred embodiment of the invention and that there are many other possible configurations which fall within the spirit of the invention. Thus, for example, whilst the parking tag 11 is disabled in the event that the available credit is zero, this need be done only if the credit stored within the parking tag 11 is incapable of being renewed. However, if the parking tag credit is renewable, then the parking tag 11 may continue functioning even in the event of a negative credit, since subsequent renewal will balance the effect of a remaining debit, the motorist paying, in effect, retroactively for the previous parking transaction which created the overdraft. It should be noted that normally it is desirable to prevent activation of the parking tag 11 if there exists a credit overdraft in order to prevent the possibility of the overdraft escalating. However, it is desirable to prevent an invalid parking signal being generated if the motorist exceeds the available credit since otherwise he would, in effect, have to calculate exactly how much credit remained within the parking tag 11 and return to his vehicle just in time in order to obtain his full money's-worth relating to the pre-purchased credit stored therein.

Additionally, whilst in the preferred embodiment the parking credit stored within the parking tag memory 17 is a monetary credit, it can also be a credit of a predetermined number of hours' parking time, which is subsequently decremented during actual use of the parking tag 11. In such case, the rate of decrementation will depend on the actual elapsed time multiplied by a factor representing the parking tariff.

It should also be noted that whilst in the preferred embodiment the reading device 12 is a portable device carried by a municipal parking official, it can also be included within a parking management system. Such systems typically have an entrance barrier which requires that an incoming motorist take a ticket showing the time of arrival, so that on his exit from the parking lot the actual elapsed time may be computed and the motorist invoiced accordingly.

When the reading device 12 is incorporated within such a parking management system, the system itself automatically sends a "start" signal to the parking tag 11 so as to activate the timer 18 therein, a suitable zone select signal likewise being transmitted to the parking tag 11 for setting the correct zone and determining the corresponding parking tariff. On leaving the parking management system, a "stop" signal is transmitted by the reading device 12 to the parking tab 11 so as to terminate operation of the timer 18, the resulting parking debit being calculated and added to the cumulative parking debit for the selected zone. In such a system, there is no actual transfer of money on exit from the parking system and the complete transaction can thus be automated.

In the embodiments described thus far, mention has been made of respective cumulative parking debits being stored in the memory 17 of the parking tag 11, each corresponding to a different zone. For reasons which have been explained in the introductory portion of this specification, it is desirable that different municipalities be reimbursed according to the actual parking debits incurred therein, so that reciprocity between different zones is unnecessary.

Figure 7:
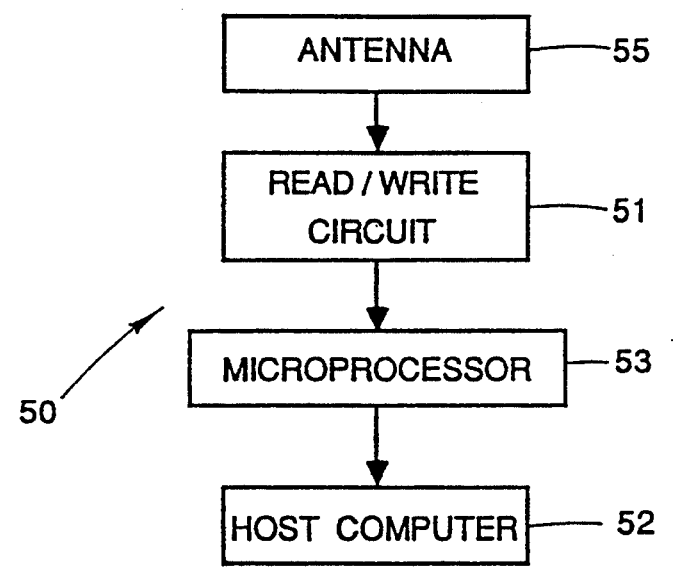
FIG. 7 is a block diagram of a credit-renewal terminal for use with the parking tag shown in FIG. 2.

FIG. 7 shows a terminal depicted generally as 50 for renewing the available credit stored within the parking tag 11 whilst, at the same time, crediting the various municipalities wherein the parking tag 11 is valid. The terminal 50 includes a read/write circuit 51 coupled to a host computer 52 via a microprocessor 53. Non-contact data communication is effected between the terminal 50 and the parking tag 11 (FIG. 1) via an antenna 55 coupled to the read/write circuit 51. The antenna 55 constitutes a parking tag coupling means for coupling the host computer 52 to the parking tag 11, the antenna 22 within the parking tag 11 constituting a host coupling means.

The host computer 52 is coupled either directly or indirectly to a central computer having access to the bank account of the parking tag owner as well as to the respective bank accounts of the municipalities in which the parking tag 11 is valid for use. The host computer 52 is adapted to read the identity of the parking tag owner as well as the cumulative debit data relating to each of the selective zones stored within the memory 17 of the parking tag 11.

Figure 8:
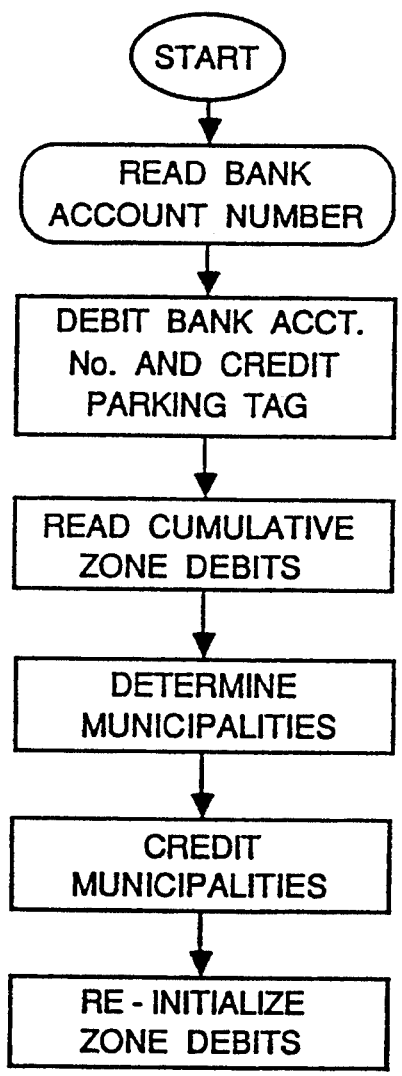
FIG. 8 is a flow diagram relating to the principal functions of the credit-renewal terminal shown in FIG. 7.

FIG. 8 shows the principal steps relating to the functional operation of the terminal 50 shown in FIG. 7. A bank account number belonging to the owner of the parking tag 11 is read from the memory 17 thereof so as to be debited by an amount specified by the owner, which is then transferred to the parking tag 11, thereby renewing its available credit.

The parking tag memory 17 is then read in order to determine the cumulative zone debits relating to each zone for which the parking tag 11 is valid. More than one zone may correspond to the same municipality and therefore the municipalities relating to each zone are determined so that the cumulative debits stored within the memory 17 of the parking tag 11 are converted from a per-zone debit to a per-municipality debit. Preferably, the portable parking tag 11 is issued not by one of the participating municipalities but, rather, by an independent credit card company which reimburses each municipality according to the debits thus determined.

Typically, the terminal 50 shown in FIG. 7 is provided in gas stations so that a motorist can renew his parking credit at the same time that he refills his fuel tank. Whilst preferably the terminal 50 effects data communication with the portable parking tag 11 via non-contact data communications, the desired data transfer may also be accomplished using conventional smart-card type terminals such as are commonly used.

The parking credit within the portable parking tag 11 may be renewed against cash paid by the motorist and subsequently transferred to the credit-card company managing the scheme. Alternatively, the motorist may pay for the renewed credit by means of a conventional credit card. In both these cases, the purchased credit is simply entered into the portable parking tag's memory 17 via a terminal in the gas station. A third possibility is that the terminal in the gas station is connected to a remote computer to which all transactions relating to parking tag purchase and credit renewal are posted, for subsequent direct debiting of the motorist's bank account and crediting of the respective municipalities' bank accounts.

Thus, in accordance with the invention, there is provided a completely integrated parking management system based on an intelligent portable parking tag and a portable reading device employing non-contact data communication. This permits the reading device to interrogate the parking tag even when the latter is located within a locked vehicle and is shielded by the windshield thereof.

The validity verification process is completely automated and therefore does not permit fraud on the part of either the parking official or the motorist. Additionally, such a system also automatically records in the reading device the activities of the parking official for subsequent analysis by the respective municipality.

Finally, any report issued to the motorist is also indelibly recorded within the parking tag's memory so that reliance on the receipt of a printed report is no longer necessary. This prevents complaints relating to subsequent non-payment of the fine on the grounds that no report was issued in the first place.

We claim:

1. A system for monitoring a plurality of parked vehicles, the system comprising a portable parking tag for each of said vehicles, each one of said parking tag being placed in a respective one of said vehicles; and a reading device;

each of said portable parking tag including:
a non-contact data communications circuit for effecting data transfer by means of mutual electro-magnetic coupling with the reading device,
a parking tag memory coupled to the data communications circuit for storing at least one validity criterion together with parking tariff data and parking credit data,
a parking tag antenna coupled to the data communications circuit for transmitting a first signal representative of said at least one validity criterion stored in the parking tag memory,
electrical supply means coupled to the non-contact data communications circuit and to the parking tag memory for supplying electrical power thereto, said electrical supply means including an uninterrupted electrical supply means,
a timer means coupled to the non-contact data communications circuit and to the uninterrupted electrical supply means and being responsive to respective start and stop signals for measuring an elapsed time period; and
a processing means coupled to the timer means and to the uninterrupted electrical supply means and being responsive to the elapsed time period, to the parking tariff data and to the parking credit data for determining a parking debit and an available parking credit;

the reading device including:
a reading device antenna for receiving the first signal,
a reading circuit coupled to the reading device antenna and responsive to the first signal for reading said at least one validity criterion stored in the memory of the parking tag, validity verification means coupled to the reading circuit and responsive to the first signal for generating a validity signal, and outputs means coupled to the validity verification means and responsive to the validity signal for producing a validity indication.

2. The system according to claim 1, wherein a second signal is received by the parking tag antenna and the electrical supply means is at least partially energized by the second signal.

3. The system according to claim 1, wherein a second signal is received by the parking tag antenna and the data communications circuit in the parking tag is responsive to the second signal for transmitting the first signal.

4. The system according to claim 3, wherein the second signal is generated by the reading device.

5. The system according to claim 1, wherein:
the parking tag memory further stores a first parking parameter corresponding to a first parking time limit, and
the processing means includes an excess-time indicating means coupled to the timer means and to the parking tag memory and being responsive to the elapsed time period and to the parking time limit for generating an excess-time signal when the elapsed time period exceeds the first parking time limit.

6. The system according to claim 1, wherein:
the parking tag memory further stores time and data data,
the portable parking tag further includes a real time clock coupled to the processing means for measuring the time and date data, and
the real time clock and the processing means are energized by the uninterrupted electrical supply means.

7. The system according to claim 1, wherein:
the parking tag memory further stores respective parking tariffs corresponding to a respective number of parking zones, and
the portable parking tag further includes:
zone selection means coupled to the parking tag memory for selecting one of said parking zones wherein the respective vehicle is parked and for generating a respective zone selection signal,
tariff determination means coupled to the parking tag memory and responsive to the zone selection signal for determining one of said parking tariffs corresponding to the selected parking zone,
said processing means being coupled to the tariff determination means and responsive to said parking tariff and to the elapsed time period for computing and storing in the parking tag memory a cumulative parking debit in respect of the selected parking zone; and
the reading device further includes:
a reading device memory for storing therein a valid zone identifier,
zone verification means coupled to the reading circuit and responsive to the first signal for reading the selected parking zone in the memory of the portable parking tag and for generating an invalid-zone signal based upon verification of the selected zone does not correspond to the valid zone identifier stored in the reading device memory;
the validity verification means being coupled to the zone verification means and being responsive to the invalid-zone signal for generating said validity signal.

8. The system according to claim 1, wherein:
a second signal is received by the parking tag antenna,
the non-contact data communications circuit includes a decoding circuit responsive to the second signal for decoding second data superimposed thereon, and
the processing means is coupled to the parking tag memory and responsive to the decoded data for processing the decoded data.

9. The system according to claim 8, wherein:
the decoded data includes said start and stop signals, and
the timer means and the processing means are energized by the uninterrupted electrical supply means.

10. The system according to claim 8, wherein:
the decoded data includes said at least one validity criterion, and
the processing means is responsive to the decoded data for modifying said at least one validity criterion in the parking tag memory.

11. The system according to claim 10, further including a writing device comprising:
a writing device antenna for transmitting the second signal,
a data generation means for generating the second data, and
a modulating circuit coupled to the writing device antenna and to the data generation means for modulating the second signal with the second data.

12. The system according to claim 11, wherein the writing device is integrated within the reading device.

13. The system according to claim 12, wherein the data generating means is coupled to the validity verification means and is responsive to the validity signal for generating the second data.

14. The system according to claim 1, wherein the reading device is included within a parking management system.

15. The system according to claim 14, wherein:
a second signal is received by the parking tag antenna,
the non-contact data communications circuit includes a decoding circuit responsive to the second signal for decoding said start and stop signals superimposed thereon,
the processing means is coupled to the parking tag memory and responsive to the decoded start and stop signals for processing the decoded start and stop signals,
the timer means coupled to the processing means is responsive to the decoded start and stop signals for measuring said elapsed time period,
the timer means and the processing means are energized by the uninterrupted electrical supply means; and
the reading device further includes:
signal generation means for generating the second signal, and
a modulating circuit coupled to the reading device antenna and to the signal generation means for modulating the second signal with the start and stop signals.

16. The system according to claim 1, wherein:

the parking tag, memory further stores an available parking credit in at least one predetermined parking zone, and the portable parking tag further includes a credit renewal means coupled to the parking tag memory for renewing the available parking credit stored therein in respect of said at least one predetermined parking zone.

17. The system according to claim 16, wherein the portable parking tag further includes:

host coupling means for coupling the parking tag to a host computer;

the host computer comprising:

parking tag coupling means for coupling to the host coupling means of the portable parking tag, and first credit transfer means for coupling to the credit renewal means of the portable parking tag and for thereby transferring thereto a desired credit.

18. The system according to claim 17, wherein:

the parking tag memory includes record storage means for storing therein a record of each parking transaction including associated parking fees corresponding to respective parking zones, the portable parking tag further includes reset means responsive to a reset signal for clearing the record storage means, and the host computer further includes:

record processing means coupled to the parking tag coupling means for reading the record storage means and accumulating for each of said zones a cumulative parking fee for said parking tag coupled to the host computer, storage means coupled to the record processing means for storing the cumulative parking fee, and reset signal generating means for generating the reset signal consequent to the cumulative parking fees being stored and prior to decoupling the portable parking tag from the host computer.

19. The system according to claim 18, wherein the host computer further includes:

a first account determination means for determining an identification code of a credit storage account in respect of a plurality of municipalities each corresponding to at least one of said parking zones, and second credit transfer means coupled to the first account determination means and to the storage means for transferring to said credit storage account said parking credit data in accordance with the stored cumulative parking fee.

20. The system according to claim 17, wherein the host computer further includes:

a second account determination means for determining an identification code of a credit storage account in with respect to an owner of said respective one of said vehicles vehicle, debit means for debiting the credit storage account by an amount at least equal to the desired credit.

* * * * *